(No Model.)
W. R. USRY.
STALK CUTTER.
No. 527,302.  Patented Oct. 9, 1894.
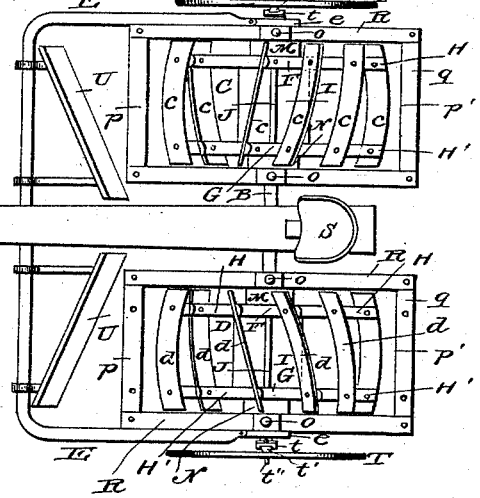
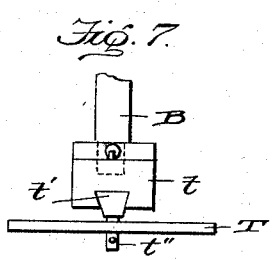
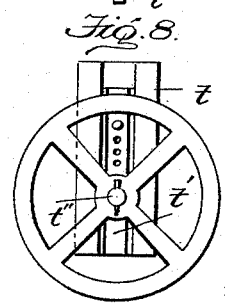
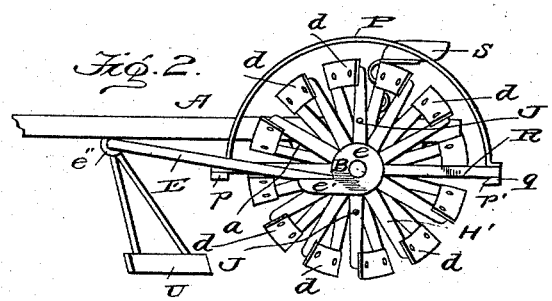
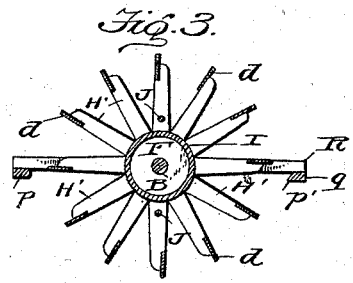
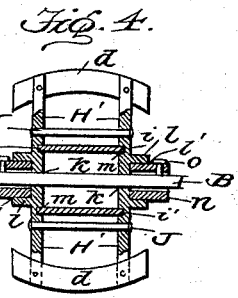
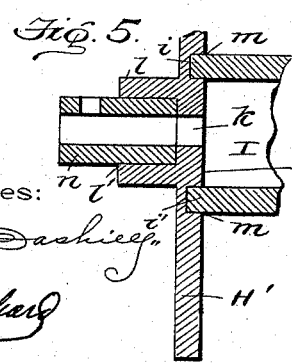
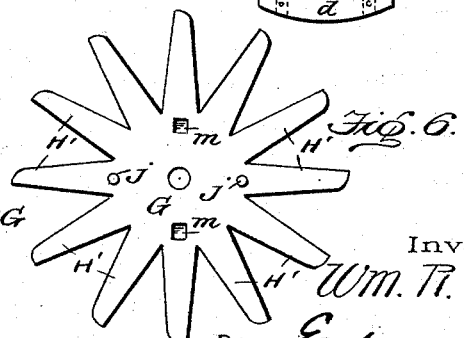
Witnesses:
Inventor.
Wm. R. Usry.
By Edson Bros.
Attorneys

UNITED STATES PATENT OFFICE.

WILLIAM RUSSEL USRY, OF GADSDEN, ALABAMA, ASSIGNOR OF ONE-HALF TO CHARLES WHITLEY EWING, OF SAME PLACE.

STALK-CUTTER.

SPECIFICATION forming part of Letters Patent No. 527,302, dated October 9, 1894.

Application filed May 17, 1894. Serial No. 511,601. (No model.)

*To all whom it may concern:*

Be it known that I, WILLIAM RUSSEL USRY, a citizen of the United States, residing at Gadsden, in the county of Etowah and State of Alabama, have invented certain new and useful Improvements in Stalk-Cutters; and I do hereby declare the following to be a full, clear, and exact description of the invention, such as will enable others skilled in the art to which it appertains to make and use the same.

This invention relates to improvements in stalk choppers of that class which employ one or more revolving cylinders or drums carrying a series of knives; and the objects of the invention are, first, to provide novel revolving cutters by which two rows of stalks can be cut with ease and dispatch as the machine is drawn over the field; secondly, to prevent the cutter wheels or cylinders from becoming clogged by any stalks that may be carried up or around with the wheels; thirdly, to provide means whereby the driver is shielded from falling on the revolving cutters; fourthly to so construct the revolving cutter and the shield-supporting contrivances as to effectually exclude dirt from entering the bearings of the revolving cutters; and finally, to simplify the construction of the cutters and render the machine efficient and reliable in operation and cheap of manufacture.

With these and such other ends in view as pertain to my invention, the first part thereof consists in the combination of a tongue having a bearing on its lower side, an axle extending through the bearing, and two revolving cutters carried by the axle on opposite sides of the tongue and each cutter carrying a series of knives which are disposed diagonally to the axis of the cutter, the knives on one revolving cutter being inclined in one direction from the tongue, and the knives on the other cutter being inclined in the reverse direction backwardly from the tongue, whereby the stalks are cut with a draw or shear cut and they are forced inwardly toward the tongue or outwardly away from the tongue according to the position of the knives on the cutter wheels.

The second part of the invention consists in the construction of each cutter wheel, the same comprising two hubs having radial spokes and each hub having recesses on the inner surfaces thereof, a thimble interposed between the hubs and provided with projections which fit in the recesses in the opposing faces of the hubs, tension bolts which connect the hubs together and operate to clamp the hubs and thimble together, and knives fastened to the other ends of the spokes.

The third part of the invention relates to means whereby the revolving cutters may be adjusted longitudinally on the axle and thereby placed at varying distances from each other, to cut rows of stalks planted at different distances apart, such adjusting means consisting of two collars clamped to the axle on opposite sides of the hubs of each revolving cutter and said collars provided with means for fastening them to the axle, and the collars being fitted in recesses in the hubs to make close joints therewith and effectually exclude dirt from the bearings of the hubs on the axle.

The fourth part of the invention relates to the shield and the means for sustaining the same over the revolving cutter in order to prevent the rider, when the machine is jolted in passing over the rows, from falling off the seat onto the blades of the revolving cutter, said shield being in the form of a segmental metallic piece attached at its ends to horizontal bars placed in front and in rear of the revolving cutter, and supporting arms rigidly fastened to the clamping collars and attached to the bars in front and rear of the cutter; and the invention further consists in the construction and combination of parts which will be hereinafter more fully described and pointed out in the claims.

To enable others to understand my invention, I have illustrated the preferred embodiment thereof in the accompanying drawings, forming a part of this specification, and in which—

Figure 1 is a plan view of my improved stalk cutter, with the shields omitted over the cutters, to show the arrangement of the knives. Fig. 2 is a side view thereof. Fig. 3 is a detail sectional view taken in the direction of the axle, on the plane indicated by the dotted line x—x of Fig. 1, and Fig. 4 is a sectional view through one of the cutters at right angles to the plane of Fig. 3, the line on which Fig. 4 is taken being indicated at $y$—$y$ on Fig. 3. Fig. 5 is an enlarged detail sectional view through one of the hubs, and one of the clamping collars, to more clearly show the construction thereof. Figs. 6, 7 and 8 are details of construction showing the cutter head and wheel adjusting mechanism.

Like letters of reference indicate corresponding parts in all the figures of the drawings, referring to which—

A designates the tongue of the machine; B, the axle extending at right angles to the tongue; and C, D, are the revolving cutters which are placed loosely on the axle on opposite sides of the tongue. Near its end, and on its lower side, the tongue, A, is provided with a single, pendent bearing, $a$, in which is secured or fitted the axle, B, and to the ends of this axle B are secured the end pieces, $e, e$, which have the arms, $e'$, extending forward beyond the axle. To these arms, $e'$, of the end pieces, $e$, are secured the rear ends of the brace or braces, E, E, which are curved or bent to afford clear spaces between the revolving cutters, C, D, and the braces, E, said braces being secured to the tongue by means of the clamp, $e'$, whereby the axle is braced and strengthened.

The revolving cutters C, D, are provided with the blades $c, d$, respectively, the blades on each revolving cutter being disposed diagonally to the axis of the cutter. In the example shown in Figs. 1 and 2 of the drawings, the blades, $c$, of the cutter C, are inclined in one direction backwardly and rearwardly from the inner side of the cutter, adjacent to the tongue, toward the outer side of the cutter, C, while the other cutter D has it blades, $d$, inclined in the reverse direction from the inner side of the cutter, adjacent to the tongue, toward the outer side of said cutter, D. The blades, $c, d$ are provided with curved cutting edges, and by the construction and arrangement of the blades on the two cutters, the inner ends of the blades, adjacent to the tongue, first cut through the stalks and as the cutters rotate the blades operate on the stalks with a draw or shear cut, thus severing the stalks easily and cleanly. At the same time the inner ends of the blades striking the ground first causes the pressure from back cutters to be toward the center, and this causes the machine to be easily kept on top of the rows. If desired, however, the revolving cutters can be taken off the axle and reversed so that the blades $c, d$ diverge from the tongue in opposite direction from that shown in Fig. 1, whereby the outer ends of the blades of the cutters will strike the ground first and the pressure will be from the center and thus the machine will run smoothly and be easily guided and kept on top of the row.

I will now proceed to a detailed description of the revolving cutters, and as the cutters are substantial duplicates of each in so far as regards the detailed construction thereof, I will deem a description of one cutter as sufficient for both, for the purposes of this specification.

The revolving cutter, C or D, consists of the hubs, F, G, the spokes, H, H', the thimble, I, and the clamping bolts, J. The hub, F has a series of spokes H cast or made integral therewith, and the other hub, G, has the other series of spokes, H', integral with the same, the hubs being assembled so that the spokes H, H', are out of line and alternate with each other, the said spokes H, H', being tapered and having the blades fastened thereto in any suitable way. The hubs F, are each made with a solid inner bearing $k$, which fits snugly to the axle, and which parts $k, k$, of the two hubs constitute the bearings for the revolving cutter on the axle; and each hub is further provided, on its outer face, with the projecting boss, $l$, forming a recess, $l'$; and on its inner side each hub has the sockets or recesses, $m$, all of which are provided in the hub when it is cast. The thimble I is made with a bore or opening of such diameter that it does not contact with the axle, and this thimble is placed or interposed between the two hubs, F, G and operates to hold them at the proper distance apart and also to inclose the axle between the two hubs so that the stalks will not become wrapped around the axle to interfere with the free rotation of the revoluble cutter thereon. At its ends, the thimble, I, is provided with the projections $i, i'$, the projections, $i$ at one end of thimble being fitted in the sockets, $m$, of the hub, F, and the projections, $i'$, at the other end of the thimble, I, being fitted in the sockets, $m$, in the other hub, G. The hubs, and thimble of the revolving cutter, are held rigidly together by means of the draw bolts, J, which are passed through apertures, $j$, in the hubs F, G, and the revolving cutter is thus "built up," so that it can be easily and readily taken apart for the purpose of having access to any part of the cutter or for removing a broken part and replacing it with a new part, whenever necessary. The thimble serves to prevent any dirt from getting to the axle between the hubs, F, G, of the cutter, and the thimble and bolts serve to rigidly hold the hubs F, G, together and to relieve the blades of the revolving cutter from strain.

The width of the cutter is considerably less than the length of the axle on either side of the tongue, A, and I have devised means whereby the two revolving cutters can be adjusted longitudinally on the axle, to spread the cutters farther apart or draw them inward toward each other, and thus accommodate the machine to cut rows of standing stalks which are planted at different distances apart. On the axle, B, are placed four collars M, N, one pair of the collars being devoted to each revolving cutter. One collar, M, is placed alongside of one hub, F, and the other collar, N, is placed alongside of the other hub, G, of each revolving cutter. These collars M, N, are provided with the tubular bosses, n, which are extended to fit in the recesses, l', of the bosses, l on the hubs, F, G, and thus the collars are adapted to fit close against the hubs and the bosses of the collar fit snugly in the bosses, l, of the hubs to exclude dirt from getting into the bearings, k, of the hubs on the axle. The collars are held rigid on the axle by means of a suitable clamp, one form of which consists of a set screw, o, which works in a tapped hole in the collar and binds against the axle. It is evident that the set screws can be loosened, to release the collar from the axle, and the collars and hubs can be moved to the desired point of the axle, after which the screws are again tightened to hold the collars close to the hubs of the revolving cutter, but at the same time the cutter is free to turn on the axle.

To prevent the driver from falling onto the blades or knives of the revolving cutters, by any jolting or vibration of the machine as it is drawn over the rows, I provide the shields P, Q, which are disposed over the revolving cutters but at a sufficient distance therefrom to enable the cutters to work freely beneath the shields. Each shield is made or formed of a piece of metal in segmental form, and at its ends the shield is secured or fastened to the horizontal bars, p, q, arranged in front and rear of the cutters. The shield and its bars, p, q, are supported by means of the side arms, R, R, which are made integral with or fastened to the clamping collars M, N, and as the shields are carried by the collars which serve to hold the cutter in proper position on the axle, the shields are adjusted when the revolving cutters are moved on the axle, to cause the shields to occupy the same relative position to the revolving cutters at all times.

S designates the driver's seat which has its standard secured to the rear end of the tongue, A, and this seat is placed on the tongue in a manner to utilize the weight of the driver in balancing the machine when it is in service in the field.

The rear bars, p, p, which sustain the rear ends of the segmental shields P, Q, are provided with the knife edges p', p', on their lower sides, and these knife-edged bars are placed quite close to the cutters C, D, so as to cut any stalks that may be carried around with the blades of the revolving cutter, whereby the machine is prevented from clogging by the stalks wedging in between the revolving cutters and the shields, and thus the machine is kept free to enable the cutters to work freely and easily.

On the squared ends of the axle are fitted the vertical bearings t, t, fastened in place by binding screws, or equivalent devices, and in vertical guide ways in the bearings are fitted the perforated slides t', t', on each of which slides is a short trunnion or stub axle t'' affording a journal for one of the carrying wheels T. Two of these carrying wheels are provided, one at each end of the axle B, and the slides t' t', and carrying wheels T, T, are made adjustable vertically so that the wheels T can be depressed to raise the cutters clear of the ground and thus enable the machine to be transported from place to place without dulling the knives, or the wheels T can be adjusted at such height as to regulate the depth that the revolving cutters penetrate the ground when cutting down the stalks, the slides t', t' being held at the desired place in the bearings t by means of the fastening pins t'' which pass through the perforations in the slide and through openings in the bearings t, t, as shown by Figs. 6 and 7.

In cutting corn stalks, I provide the drag hooks, U, which are attached to the braces, E, E, and arranged to press against the stalks and depress them into the path of the cutters, but in cutting down cotton stalks, these draw hooks are not necessary and can be dispensed with.

I attach importance to the construction of each revolving cutter with the tapering spokes H, H', and to the construction and arrangement of the blades or knives on said spokes, as by the construction and arrangement shown the revolving cutter is better adapted to penetrate the ground, with less friction and interruption to its progress, than when solid hubs of large diameter are used. It is also evident that each cutter can be adjusted longitudinally on the axle along with its shield by simply loosening up the set screws and moving the collars, M, N, and the cutters can be taken off the axle by detaching one collar and the end piece e. The thimble of the revolving cutter prevents the stalks from being wrapped around the axle and from interfering with the free rotation of the cutters thereon. Furthermore, dust and dirt cannot get into the bearings k of the revolving cutters because the thimble is closely joined to the hubs and the collars M, N, are fitted close up against the outer sides of the hubs, and the knife edged bars p cut any stalks that may be carried up with the revolving cutter and thus prevent clogging of the machine.

I am aware that changes in the form and proportion of parts and in the details of construction of the mechanisms herein shown and described as an embodiment of my invention can be made by a skilled mechanic without departing from the spirit or sacrificing the advantages thereof, and I therefore reserve the right to make such modifications and alterations as fairly fall within the scope of my invention.

Having thus fully described my invention, what I claim as new, and desire to secure by Letters Patent, is—

1. In a stalk chopper, the combination with a tongue and an axle, of two independent revolving cutters fitted on the axle on opposite sides of the tongue and each cutter carrying a series of diagonal knives or blades, the blades on one cutter being arranged in a reverse diagonal position to the blades on the other cutter, substantially as described.

2. In a stalk chopper, the combination with a tongue and an axle, of the independent revolving cutters fitted loosely on the axle, and each cutter provided with the two series of arms which are arranged out of line with each other and the knives or blades secured to the outer ends of the spokes in a diagonal position to the axis of the cutter, the blades of one cutter being arranged in reversed diagonal order to the blades on the other cutter, substantially as and for the purposes described.

3. In a stalk chopper, the combination with a transverse axle a revolving cutter consisting of two hubs provided with radial spokes, a thimble fitted around the axle and interposed between the hubs, means for clamping the hubs, upon the ends of the thimble, and the blades or knives secured to the outer ends of the radial spokes, substantially as and for the purposes described.

4. In a stalk chopper, the combination with a transverse axle a revolving cutter comprising the two hubs provided with radial spokes, the thimble fitted around the axle and interposed between and bearing against the hubs, the draw bolts connecting the hubs, and the blades secured to the spokes, substantially as described.

5. In a stalk chopper, the revolving cutter comprising the spaced hubs which are provided with radial spokes and with sockets in their opposing faces, the thimble interposed between the hubs, and provided at its ends with tenons which are fitted in the sockets of said hubs, the draw bolts, and the blades secured to the spokes, substantially as described.

6. In a stalk chopper, the revolving cutter comprising the spaced hubs having the axle bearings and the projecting bosses, the thimble interposed between the hubs and bearing against the same outside of the circle of the bearings on the axle, the draw bolts, the blades, and collars fitted in said bosses of the hubs, substantially as and for the purposes described.

7. In a stalk chopper, the combination with the axle, of the revolving cutter having its hubs provided with the recessed bosses and the bearings, the thimble fitted around the axle and clamped to and between the hubs, and with the blades secured to the spokes on said hubs, and the clamping collars fitted to the axle against the hubs and provided with bosses which fit in the recessed bosses of the hubs, substantially as described.

8. In a stalk chopper, the combination with an axle, of the revolving cutter adjustable longitudinally on the axle and comprising the hubs provided with the radial spokes, and the thimble which is fitted around the axle and clamped between the hubs, and the collars clamped to the axle at opposite ends of the revolving cutter and adjustable longitudinally on the axle with said cutter, substantially as described.

9. The combination with an axle, of the revolving cutter fitted loosely upon and adjustable longitudinally on said axle, the collars clamped to said axle on opposite sides of the cutter and provided with the arms, and a shield over the cutter and carried by the arms to be adjustable with the collars and the cutter, substantially as described.

10. The combination with an axle, of the revolving cutter, the collars clamped to said axle and provided with the side arms, the rear knife bar fixed to said side arms, the front bar attached to the side bars and the shield attached to the front and rear bars, substantially as described.

In testimony whereof I affix my signature in presence of two witnesses.

WILLIAM RUSSEL USRY.

Witnesses:
C. W. EWING,
R. H. CASEY.